Aug. 11, 1964　　　　　　　L. D. KAY　　　　　　　3,144,100
VEHICLE BRAKING SYSTEM
Filed Feb. 27, 1963　　　　　　　　　　　　　　2 Sheets-Sheet 1

INVENTOR.
LLOYD D. KAY
BY
ATTORNEY

INVENTOR.
LLOYD D. KAY

United States Patent Office  3,144,100
Patented Aug. 11, 1964

3,144,100
VEHICLE BRAKING SYSTEM
Lloyd D. Kay, San Marino, Calif., assignor to Kay-Brunner Steel Products, Inc., Los Angeles, Calif., a corporation of Delaware
Filed Feb. 27, 1963, Ser. No. 261,266
13 Claims. (Cl. 188—2)

The present invention relates to wheel brakes and more particularly to a heavy duty brake suitable for use on trucks and other wheel-supported equipment of the types used off highways as well as others customarily used on highways and featuring simplified components including a pair of brake shoes each having its own cam actuator and associated power operator as well as special means for applying braking loads uniformly to the shoes throughout their width.

Much study and effort has been expended to improve the efficiency and effectiveness of braking assemblies and for assuring more equitable distribution of the braking force to the shoes and braking drums. Despite these efforts, constructions so far provided fall far short of providing the reliable trouble-free and effective results desired. This has been found particularly serious with respect to larger and heavier equipment where effective use of all available braking power is of paramount importance and where very large braking forces are required to be absorbed by the brake drum and shoes in cooperation with the actuating and supporting equipment therefor.

It is the purpose of this invention to obviate the foregoing and other deficiencies of the prior brake constructions and to provide an improved greatly simplified brake assembly having fewer components featuring a number of improvements including a one-piece anchor member of unique and unusually simple design and pivotally supporting a pair of brake shoes. This anchor member may be described as having a generally X-shaped configuration with its two legs disposed parallel to one another but offset axially. This offset permits one pair of legs to support the pivoted ends of the brake shoes and the ends of the other leg to be utilized to support separate cam actuators lying in the same plane as the pivoted ends of the brakes and thereby effective to supply the braking force equitably and medially of both shoes. This anchor member lies within the confines of the brake drum and rigidly secured to the axle housing in any suitable manner. Support of all movable parts of the brake assembly by a common anchor member greatly simplifies machining of the several journals to lie in parallelism with one another and with the axis of the axle to be braked.

Another feature of the invention is the fact that the operating shafts for the cam actuators lie laterally along either side of the axle housing and pass through the inboard leg of the anchor casting. In consequence the cam actuator integral with the outer end of the shaft lies immediately beside the outwardly facing side of the anchor leg in which the actuator shaft is journalled. Desirably the cam actuator shafts, the inboard brackets therefor, and a common support bracket for the operating boosters are all positioned above the lower edge of the axle housing; hence these components are clear of any obstacle in the path of travel cleared by the axle housing.

A further feature is the fact that each brake shoe operates entirely independently of the other in each brake assembly. For this reason failure of either booster, the shoe operated thereby, or of the intervening components does not interfere with the full efficiency and operating effectiveness of the other shoe and its operating booster assembly. Since the pivot supports and the cam actuators for each pair of shoes lie in a common plane passing through the longitudinal medial plane of these shoes, it will be recognized that the invention brake assembly is structurally and functionally balanced. The braking load applied to either shoe being equally distributed throughout the width of the shoe, major causes of chatter, unequal wear, non-uniform application of braking force and tendency of the shoes to twist or tilt with respect to their longitudinal axes are virtually eliminated.

Accordingly, it is a primary object of the present invention to provide an improved and superior brake assembly utilizing separate power actuators for each shoe and wherein the braking load is distributed equitably transversely of each shoe.

Another object of the invention is the provision of an improved, simplified, rugged braking assembly equally suitable for use on the highway as well as in off-the-highway applications.

Another object of the invention is the provision of a rugged braking assembly featuring a unitary one-piece anchor member rigidly securable to the axle housing and having provision for equitably supporting and actuating a pair of brake shoes.

Another object of the invention is the provision of a braking assembly having a pair of similar brake shoes engageable with a common brake drum and each powered by an independently operable power unit.

Another object of the invention is the provision of a one-piece brake anchor casting having crisscross integral legs axially offset from one another, the opposite ends of one leg being arranged to pivotally support the separate brake shoe the opposite ends of the other leg being adapted to support separate cam actuators for the pair of brake shoes.

Another object of the invention is to provide a brake assembly having a one-piece anchor member supporting a pair of brake shoes and a pair of actuators therefor in combination with a second casting securable to the axle housing for supporting a pair of separate boosters for operating respective ones of the cam actuators.

These and other more specific objects will appear upon reading the following specification and claims and upon considering in connection therewith the attached drawings to which they relate.

Referring now to the drawings in which a preferred embodiment of the invention is illustrated:

Figure 1:
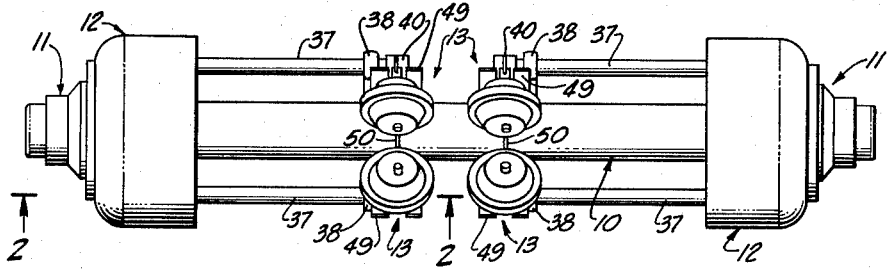
FIGURE 1 is a top plan view of a braking assembly embodying the present invention.

Referring first more particularly to FIGURE 1, there is show a typical embodiment of the present braking system comprising a tubular axle housing 10 enclosing axle means 10a having fixed to its opposite ends wheel hub assemblies 11, 11 and a rigidly attached inwardly projecting brake drum 12. Sets of brake shoes are housed within the brake drums and each shoe is operatively connected to an independent power unit 13, 13, as will be described more fully presently.

Figure 5:
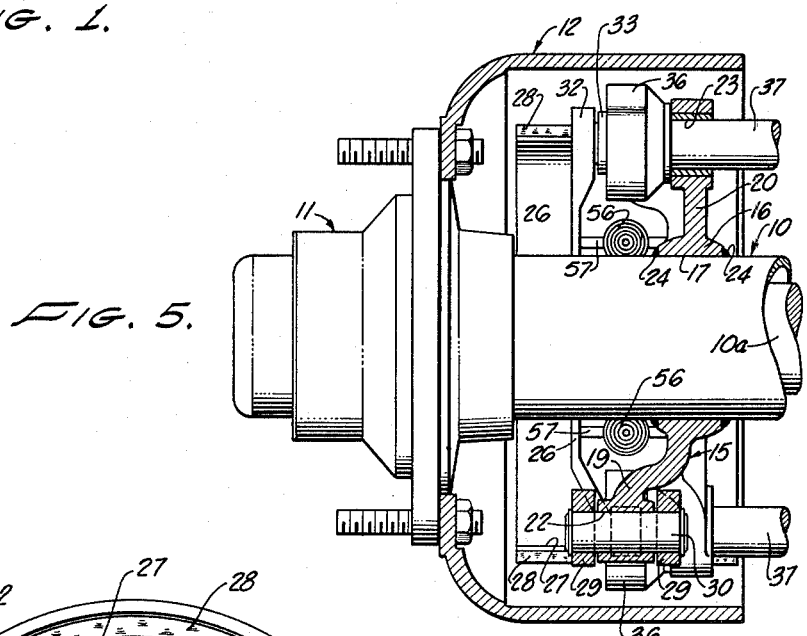
FIGURE 5 is a cross sectional view taken along broken line 5—5 on FIGURE 4.
Figure 4:
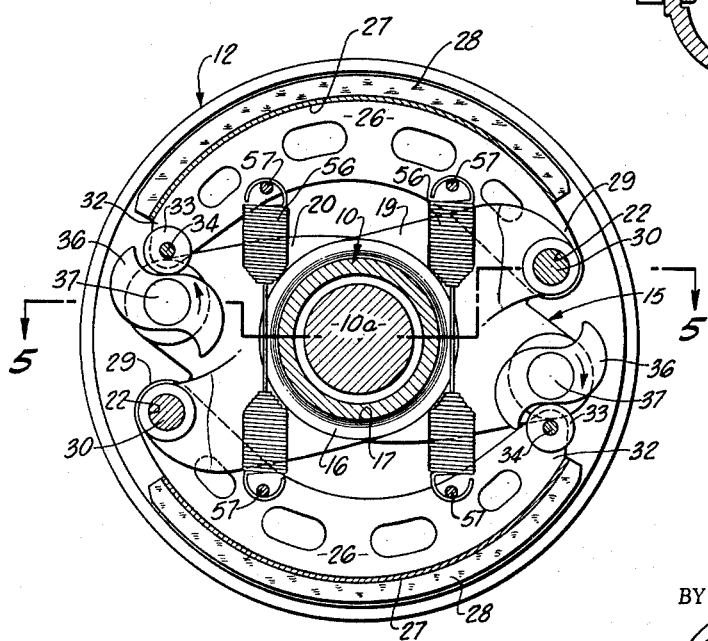
FIGURE 4 is a transverse sectional view through the brake proper taken along line 4—4 on FIGURE 2.

Referring now to FIGURES 4 and 5, it is pointed out that a particularly important component of the invention includes a unitary high strength anchor casting 15 for each brake drum. This casting is desirably formed from high strength cast steel or the like and may be conveniently described as X-shape in configuration and best illustrated in FIGURE 4. Anchor 15 has a tubular central hub portion 16, bore 17 of which is sized to have a snug sliding fit over axle housing 10. One leg 19 of the X-shaped casting, as shown in FIGURE 4, is inclined downwardly towards the left, whereas the other leg 20 is spaced slightly rearwardly of leg 19 and parallel thereto but is inclined downwardly toward the right. It will therefore be recognized that legs 19 and 20 are in closely adjacent parallel planes and are inclined acutely to one another. Furthermore, these legs include webs integrally joining them together between their adjacent inner surfaces and each leg projects radially from hub 16.

The opposite or outer ends of leg 19 are provided with large diameter journal bores 22, 22, whereas the outer ends of leg 20 are provided with similar but slightly larger journal bores 23, 23. Desirably either or both pairs of journals are equipped with suitable bearing insert sleeves. It will be understood that the axes of journals 22, 23 lie parallel to one another and to the axis of hub 16. The latter is rigidly and suitably secured to axle housing 10 between the opposite ends of brake drum 12, as by welds 24.

The arcuate shaped brake shoes are best shown in FIGURE 4 and each includes a main body 26. This body has a semi-cylinder portion to which a thick brake shoe 28 is rigidly secured and a pair of parallel inwardly projecting webs. One pair of ends 29, 29 (FIG. 2) of these webs straddles and are pivotally connected to one end of anchor casting leg 19 by a pivot pin 30 seated in journal 22. The opposite ends 32 of these same brake shoe webs support the opposite ends of a pin 34 on which is an idler roller 33 (FIG. 4). Rollers 33 at the non-pivoted or free end of the two brake shoes normally ride against the midportion of an associated conventional S-shaped cam actuator 36.

Figure 2:
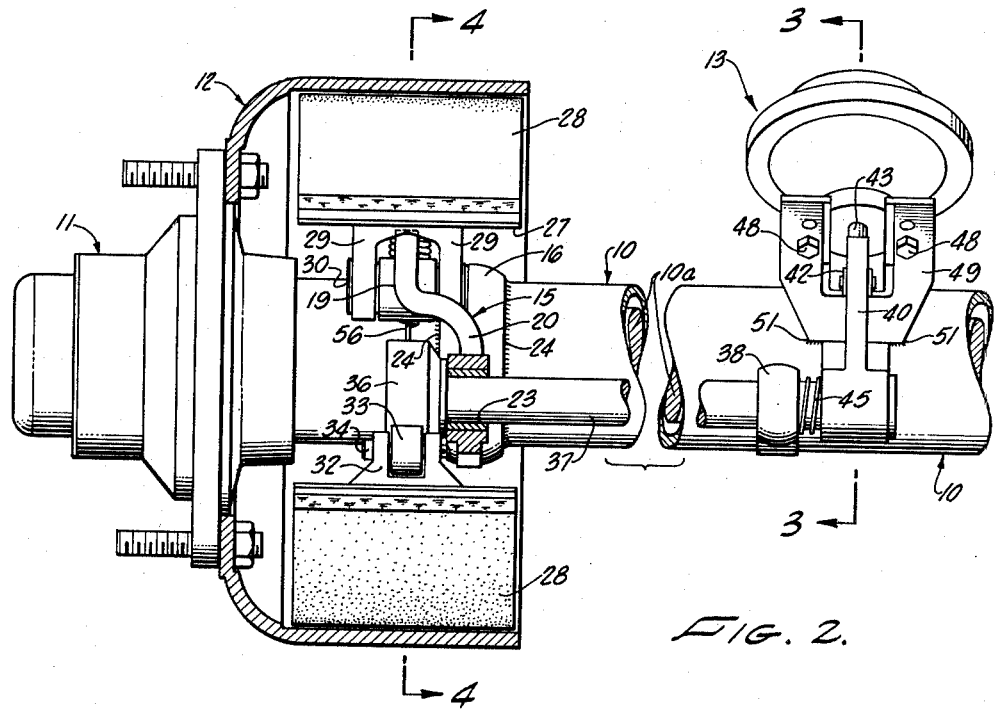
FIGURE 2 is an enlarged cross sectional view taken along line 2—2 on FIGURE 1.
Figure 3:
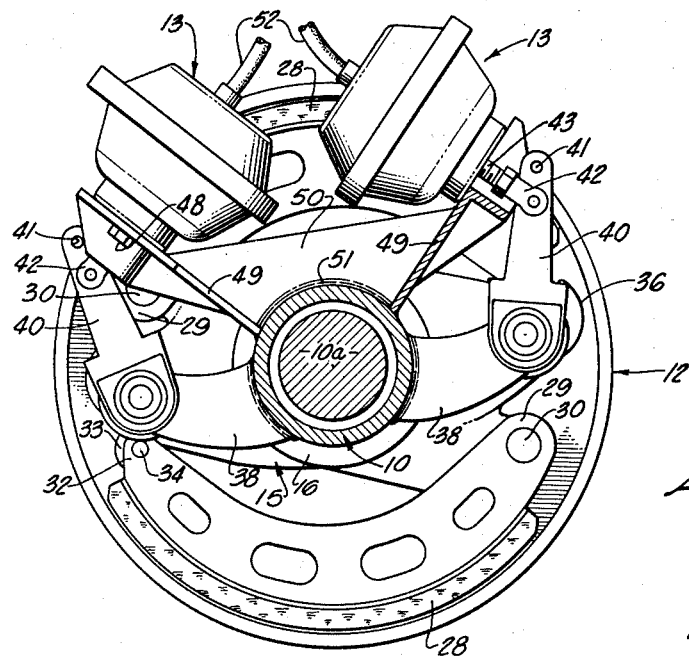
FIGURE 3 is a partial cross sectional view taken through the brake booster assembly along line 3—3 on FIGURE 2.

Rotatably seated in journals 23 at the opposite ends of anchor leg 20 are the respective shafts of the S-shaped cam actuators 36. The cams are preferably forged integral with one end of shafts 37 (FIGS. 2 and 5). The inboard ends of shafts 37 are supported parallel to housing 10 and against its forward and rearward sides by means of brackets 38, 38 (FIGS. 2, 3) welded or otherwise secured to housing 10. Securely keyed to the inner ends of the shafts are conventional crank arms 40 having one or more holes 41 therealong in one of which are pinned clevises 42 attached to the outer ends of operating rods 43 of conventional brake boosters 13. As is best shown in FIGURE 2 a compression spring ring 45 encircles the actuator shafts 37 between brackets 38 and arms 40 and serve to bias shafts 37 to the right as viewed in FIGURE 2 thereby holding the cam 36 on the outer ends of these shafts seated against the exterior face of leg 20 of the anchor casting.

The conventional pressurized fluid operated boosters 13, 13 are detachably secured, as by cap screws 48, to the bifurcated ends of bracket plates 49, 49 rigidly connected together by an intervening web 50, this bracket unit being welded to axle housing 10 by welding 51. It will be understood that each booster supports a rubber diaphragm diametrically of its mid-portion normally spring pressed upwardly against the interior top end of the booster casing. Pressurized fluid, such as air, is supplied to the upper ends of these housings by conduits 52 from a suitable control valve (not shown) but operable either by hand or by the operator's foot or in any other suitable manner. When the valve is positioned in its non-braking closed position, the upper ends of the boosters are vented to the atmosphere and the springs on the underside of the diaphragms are effective to retract rods 43 thereby rotating arms 40 and shafts 37 to position actuator cams 36 in a neutral non-braking position shown in FIGURE 4. In this position the brake shoe linings are out of contact with the interior surface of drum 12. Retraction of the shoes is assured by reason of the strong retraction springs 56, 56 shown in FIGURE 4, the opposite ends of these springs being engaged over pin 57 extending crosswise between the webs of the main bodies 26 of the shoes. Accordingly, it will be understood the springs are effective in urging the shoes to pivot inwardly about pivot pins 30, 30 and away from the brake drum.

The operation of the described brake assembly will be quite apparent from the foregoing detailed description of the components and their structural and operative relationships to one another. The brakes are applied by supplying pressurized fluid to one or both boosters associated with each brake assembly. Normally air at the same pressure is supplied to both boosters simultaneously. This results in rotation of actuator arms 40, 40 in opposite directions as viewed in FIGURE 3 thereby rotating cam actuators 36 and this is effective in known manner against rollers 33, 33 to force the free ends of each shoe outwardly about pivot pins 30 into firm engagement with the interior sidewalls of drum 12. The reaction forces associated with the application of the brakes is absorbed in part by the frictional engagement of the brake shoe with the brake drum and in part by the unitary anchor casting 15 rigidly secured to axle housing 10. Furthermore and of particular importance is the fact that owing to the fully balanced nature of the design the applied and reaction forces act along a common plane passing longitudinally and medially through the brake shoes. It will therefore be evident that the pressure between the lining and the brake drum is uniform throughout the width of the brake shoes.

If for any reason the air pressure to any booster fails the other booster and the associated shoe remain fully effective to provide the usual braking effort independently of the inoperative shoe.

It will be understood that anchor members 15, though referred to above as cast, may be formed by other suitable techniques as, for example, by forging. Likewise cam actuators 36, 36 may be cast or forged and secured to actuator shafts 37 in any suitable manner.

While the particular vehicle braking assembly herein shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. A wheel braking assembly comprising an axle having a brake drum for a wheel, a stationary housing for said axle, an anchor member rigidly fixed to the exterior of said axle housing and located interiorly of said brake drum, said anchor member being generally X-shaped with its two legs lying in parallel planes and each having journal openings through the opposite ends thereof, a pair of brake shoes having one end pivoted to a separate pair of said openings, a pair of cam actuators for said brake shoes journalled in the other pair of said openings and positioned to engage the nonpivoted ends of said shoes, and separate power actuated means operatively connected to and effective to rotate said cam actuators to pivot said shoes into engagement with said brake drum.

2. A wheel brake assembly as defined in claim 1 characterized in that said power actuated means comprises a pair of independently operable booster assemblies rigidly supported on said axle housing inboard from said brake drum.

3. A wheel brake assembly as defined in claim 1 characterized in that said cam actuators are located in a common plane with one another and with the pivot connection between said anchor member and said pair of brake shoes.

4. A brake assembly as defined in claim 1 characterized in that the pivoted ends of said brake shoes have a bifurcated portion straddling the ends of said anchor and including a pivot pin connecting the same to one pair of openings in said anchor member.

5. A brake assembly comprising an axle journalled within a surrounding axle housing and having separate brake drums fixed to the opposite ends of said axle, unitary X-shaped anchor members mounted within said drums and having their midportions pierced by said housing and secured thereto, the two legs of said anchor member having their outer ends lying in axially offset parallel planes and each leg being provided at its opposite ends with transverse journals, a pair of brake shoes for each drum including means pivotally connecting one end of each to the journals in the opposite ends of a first leg of said anchor member, the opposite nonpivoted end of said brake shoes terminating closely adjacent the journals in a second leg of said anchor member, separate cam actuators journalled in the second leg of said anchor member with their cam surfaces positioned to engage the adjacent ends of said shoes and pivot the same outwardly into braking engagement with the interior side walls of said brake drums, and separate boosters connected to said cam actuators for operating the same.

6. A brake assembly as defined in claim 5 characterized in that said brake shoes include an arcuate main body having inwardly projecting web means therealong, means pivotally connecting one end of said web means of each shoe to a journal of said anchor member, roller means carried by the other end of each of said shoe web means and positioned to be engaged by said cam actuator.

7. An article of manufacture comprising a unitary anchor member adapted to be mounted on an axle housing in an area thereof surrounded by a cup-shaped brake drum, said anchor member being generally X-shaped with the two legs thereof integral with one another to points closely adjacent their opposite ends and lying in parallel planes, a large diameter transverse opening through the center of the said anchor member to receive an axle housing, a journal opening through each end of said legs having axes parallel to one another and to said opening at the center of said anchor member, one pair of said journal openings being adapted to support a brake shoe actuating cam therein and the other pair of said openings being adapted to pivotally support one end of a brake shoe in such manner that the opposite end of the brake shoe will be positioned to rest on one of said brake shoe actuating cams.

8. An article of manufacture comprising a unitary anchor member adapted to be telescoped over the end of an axle housing and to be welded thereto in an area between the opposite ends of a brake drum, said anchor member having a cylindrical hub through the center thereof sized to fit over an axle housing, said anchor member being X-shaped with its two legs lying parallel and making an acute angle with one another and being cast integral with said hub and with one another substantially throughout the lengths thereof, the opposite ends of said legs having journals therethrough lying parallel to one another and to said center opening, a first diagonally disposed pair of journals in said legs being adapted to have one end of a pair of arcuate brake shoes pivotally coupled thereto, and the other diagonally disposed pair of journals being adapted to rotatably support cam actuators having cam means lying in the same plane as said first pair of journals and in position to engage the nonpivoted end of the brake shoes.

9. An article of manufacture comprising a unitary single piece anchor member suitable for use to support a pair of brake shoes and a pair of associated actuators therefor in such manner that the forces acting on both ends of the shoes lie in a common plane substantially centered between the opposite lateral edges of the shoes thereby to distribute the braking force equitably to the brake drum engaging surfaces of the shoes, said anchor member having a pair of legs lying in parallel planes and crossing one another at an acute angle, said legs being integrally joined to one another substantially throughout their length and projecting radially from the opposite sides of a tubular hub extending transversely through the central portion of the anchor member with its axis lying normal to the plane of said legs, the opposite ends of said pair of legs having large diameter journals therethrough parallel to the axis of said tubular hub, the journals at the opposite ends of one of said legs being adapted to seat a pair of cam actuators therein with the cam portions thereof positioned in the same plane as the outer ends of the other of said legs, and the journals in the outer ends of said other leg being adapted to pivotally support one end of a pair of brake shoes with the other end of each shoe resting against an associated one of said cam actuators.

10. A wheel braking assembly comprising an axle housing enclosing an axle assembly having fixed to its outer ends a wheel hub and an inwardly facing brake drum, a separate power-operated brake shoe assembly rigidly secured to the opposite ends of said axle housing and operatively associated with said brake drums, each brake shoe assembly including bracket means fixed to the sides of said axle housing and supporting thereon a pair of brake boosters, an X-shaped anchor member having a transverse opening through its center fixed to said axle housing within the adjacent brake drum and having its two legs lying in adjacent parallel planes and projecting radially from the opposite sides of said housing, journals in the outer ends of each of said legs, cam actuator and supporting shaft units supported at their outer ends in the journals at the outer ends of the inner leg of said anchor member and supported at their inner ends by said bracket means and including an operating connection to one of said brake boosters, a pair of arcuate brake shoes having their one end pivotally connected to the journals at the outer ends of the outer leg of said anchor member and having their opposite end bearing against an adjacent one of said cam actuators, and coil spring means interconnecting said brake shoes and effective to hold said shoes retracted so long as said cam actuators are not activated by said brake boosters.

11. A braking assembly as defined in claim 10 characterized in that brake actuators are disposed one forwardly and one rearwardly of said axle housing with their axes lying in a plane above the lower side of the axle housing so as to clear any ground obstacle cleared by the axle housing.

12. A braking assembly as defined in claim 11 characterized in that said brake boosters are supported on said bracket means in positions overlying the upper side of said axle housing, and each of said brake boosters having an independent pressurized fluid supply conduit whereby said brake boosters may be operated separately and together thereby to activate either or both brake shoes.

13. A braking assembly as defined in claim 12 characterized in that said brake shoes have an inwardly projecting support underlying the longitudinal central portion of the shoe, and supporting means at their opposite ends for connecting one end to the anchor member and the other to said cam actuator whereby the braking load is distributed substantially equally through the width of the shoe.

No references cited.